July 29, 1969    B. H. MARSH ET AL    3,458,674
QUICK RELEASE INSPECTION HEAD WITH MAGNETIC HOLDING MEANS
Filed Feb. 9, 1967

INVENTORS
BENJAMIN H. MARSH
JOHN R. SWEET III

BY

ATTORNEYS

United States Patent Office 3,458,674
Patented July 29, 1969

3,458,674
QUICK RELEASE INSPECTION HEAD WITH MAGNETIC HOLDING MEANS
Benjamin H. Marsh and John R. Sweet III, Sunnyvale, Calif., assignors to Icore Industries, a corporation of California
Filed Feb. 9, 1967, Ser. No. 614,831
Int. Cl. H01h *3/16*
U.S. Cl. 200—61.41     2 Claims

ABSTRACT OF THE DISCLOSURE

An inspection head for inspecting a series of moving articles, such as cans on a conveyor, is provided with a magnetic catch whereby if the cans jam up against the head, the magnet releases the head after a certain force is achieved preventing damage to the head.

Cross references to related applications: None

Background of the invention

*Field of the invention.*—Inspection device for articles moving over a conveyor.

*Description of the prior art.*—Heretofore inspection heads were subject to breakage when articles jammed on the conveyor and the present invention relates to a quick release means so that no further damage is done to an inspection head when the line jams.

Summary of the invention

An inspection head for use on a can line or the like wherein the head is held in place by a magnet. After a certain force is achieved, sufficient to separate the magnetic parts slightly, there is almost no further resistance to movement, so the head swings out of the way and is not injured by a jam. On the other hand, if the head were spring mounted, the further it moved out of position the greater the force on the head so that it might be damaged. In addition, since the probe must be precisely positioned for inspection and bears down with some force, an ordinary spring could not be used, as the head would move slightly as each can passed. An over center or toggle spring would overcome this objection, but would not fall and lock into operating position by itself after the jam was cleared.

Brief description of the preferred embodiments

Figure 1:
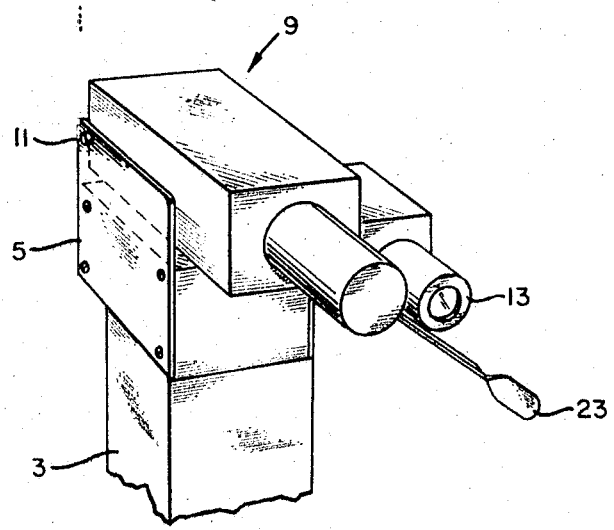
FIGURE 1 is a perspective view of an inspection head embodying the present invention showing the head in position normally assumed for inspection purposes.

The device of the present invention is primarily adapted for a can inspection line wherein the cans roll over a path of travel as is shown in Patent 3,203,547. Although that particular patent relates to a photoelectric sensing system, it is common to employ a probe which reaches over and mechanically touches cans rolling along the line. Such a device makes a very simple label detecting machine. Since the paper label of a can is an insulator, if the label is properly in place, a can can roll under the inspection finger or probe without closing an electrical circuit. On the other hand, should the label be either misplaced or missing entirely, some of the bare metal of the can will be exposed so that an electrical circuit can be closed by contact of the probe on the bare metal of the can. Such a circuit can be used to cause the particular contatiner to be ejected into a separate path.

With such devices there is always the problem of cans jamming up on the line and forcing themselves under the inspection head. Since the cans are travelling at a high rate of speed, when this happens sufficient force may be generated to damage the head. This problem would only partially be solved by employing a spring mounting since as the force against the head is increased, the force holding it down would increase, which might still result in damage to the head. However, by employing a magnet hold-down device, the opposite effect is achieved, i.e. the holding force falls off inversely as the square of the distance so that when there has been a slight separation between the two magnetic elements, the holding force goes almost to zero, allowing the head to swing freely out of the way.

In the drawings, there is shown a frame element 3 having mounting plates 5 and 7 thereon with the inspection head generally designated 9 hingedly mounted by means of pin 11 passing between the plates 5 and 7. In addition, it is common for such inspection heads to incorporate a photoelectric cell device 13 but this is included only for the purpose of completeness since it is not essential to the operation of the present invention.

Mounted under the head 9 are the magnetic elements 15 and 17. These can be small bar magnets mounted with opposite polarity so they normally attract or one might be a bar magnet and the other merely a piece of magnetizable material such as soft iron. In addition, the head of the present invention may include a pair of electrical contacts 19 and 21 which are adapted to complete a circuit from the probe 23 to some inspection device or rejection mechanism, not illustrated.

Figure 2:
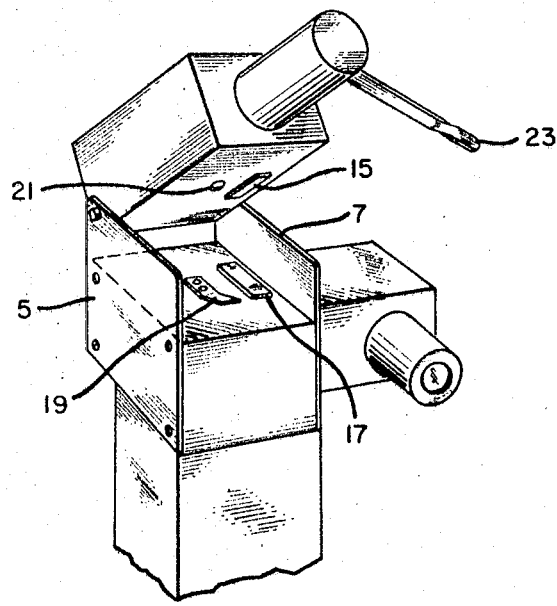
FIGURE 2 is a perspective view, similar to FIGURE 1 showing the head swung out of the way as might occur during a jam.

It will be understood that normally the frame 3 is mounted on the side of a conveyor or roller means such as that shown in Patent 3,203,547 where cans or the like roll along the path of travel and normally come into contact with the probe 23. If the cans have a label, no electrical circuit is completed while if the label is missing or is at an angle, allowing the metal probe 23 to touch the metal of the can, a circuit will be completed through probe 23 and contacts 19 and 21 which will actuate a rejection mechanism. As can be seen, if the head 9 were rigidly fixed over the path of travel and the cans, moving at a high rate of speed jammed up in front of the head, the head might well be damaged and the probe 23 permanently deformed. However, by employing the magnetic elements 15 and 17, sufficient force is achieved to hold the head in place during normal inspection operations yet, when the head is slightly displaced, the holding force instantly falls to almost zero, allowing the head to swing harmlessly out of the way as is shown in FIGURE 2 protecting the head from damage. Simultaneously, the contacts between 19 and 21 are broken and breakage of this circuit may be used to actuate some device for stopping the overall operation of the machine.

We claim:
1. In an inspection head, said head overlying the path of travel of a plurality of articles, said head including a finger extending downwardly in the path of travel and adapted to contact said articles, said head normally remaining in a fixed position as articles to be inspected contact said finger, the improvement comprising:
 (a) a fixed frame member;
 (b) an inspection head hingedly mounted on said frame member;
 (c) magnet means normally holding said head into a fixed position with respect to said frame and
 (d) said hinge permitting said head to swing out of the path of travel of said articles when a jam of articles causing pressure on said finger above normal inspection pressure.
2. The structure of claim 1 wherein said head includes an electrical contact finger and wherein a circuit is com- pleted between said head and said frame when the head is held in fixed position with respect to said frame and broken when the head swings away from said frame.

References Cited

UNITED STATES PATENTS

| | | | |
|---|---|---|---|
| 2,782,407 | 2/1957 | Ver Nooy | 174—116 |
| 2,997,556 | 8/1961 | Anderson | 200—61.41 |
| 3,109,410 | 11/1963 | Ver Nooy | 174—116 |
| 3,233,717 | 2/1966 | Jin et al. | 198—232 X |
| 3,297,127 | 1/1967 | Dennerlein | 198—232 X |
| 2,089,936 | 8/1937 | Ahlburg | 200—61.41 |
| 2,253,252 | 8/1941 | Smith | 335—302 |
| 2,658,967 | 11/1953 | Matschke | 200—61.41 |
| 3,325,611 | 6/1967 | Gourley et al. | 200—61.41 X |

ROBERT K. SCHAEFER, Primary Examiner

ROBERT A. VANDERHYE, Assistant Examiner

U.S. Cl. X.R.

198—232